P. KENNEDY.
BELT FASTENING.
APPLICATION FILED JUNE 28, 1911.
1,134,139.
Patented Apr. 6, 1915.
Fig. 1,
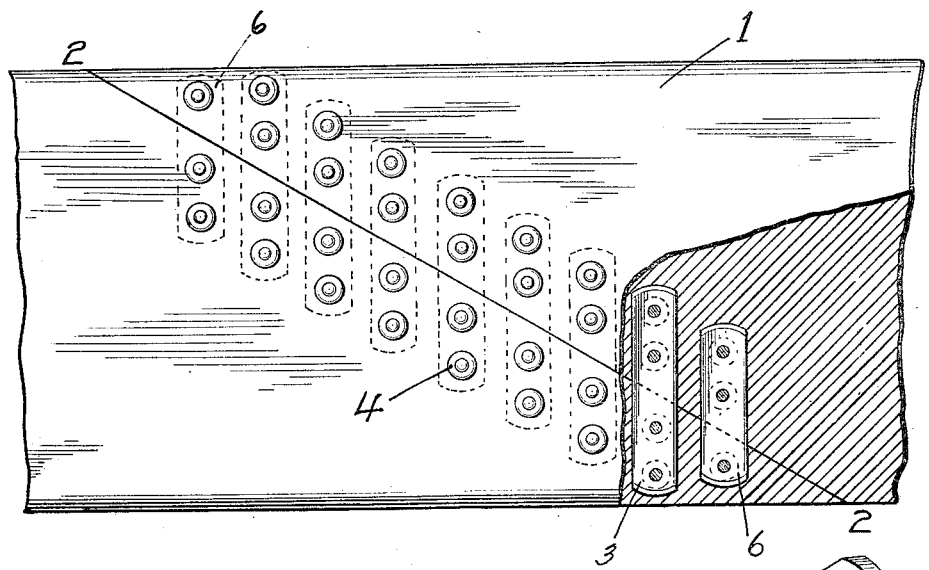
Fig. 3,
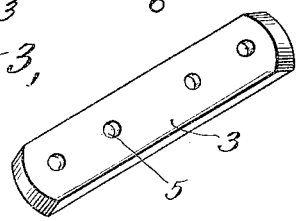
Fig. 2,
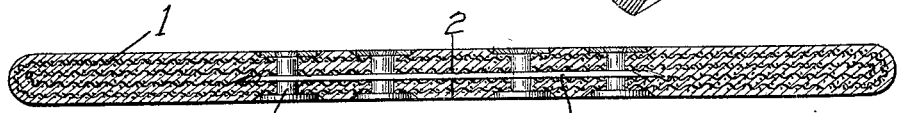
Fig. 4,
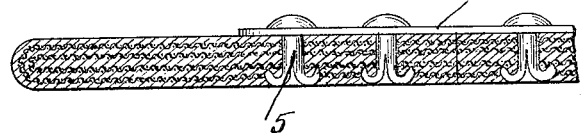
Fig. 5,
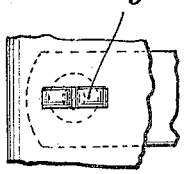
WITNESSES:
Josephine McGuire
Marie Agnes Bill
INVENTOR
Patrick Kennedy
BY
Pennie, Davis & Goldsborough
ATTORNEYS

UNITED STATES PATENT OFFICE.

PATRICK KENNEDY, OF NEW YORK, N. Y.

BELT-FASTENING.

1,134,139. Specification of Letters Patent. Patented Apr. 6, 1915.

Application filed June 28, 1911. Serial No. 635,781.

*To all whom it may concern:*

Be it known that I, PATRICK KENNEDY, a citizen of the United States, residing at and whose post-office address is 177 Putnam avenue, borough of Brooklyn, county of Kings, city and State of New York, have invented certain new and useful Improvements in Belt-Fastenings; and I do hereby declare the following to be a full, clear, and exact description of the invention, such as will enable others skilled in the art to which it appertains to make and use the same.

The invention relates to improvements in belt fastenings, and the object is to produce such a fastening that the thickness of the belt will not be substantially modified at the joint, the fastening will not unduly project on either side of the belt, and the joint will not materially affect the longitudinal and transverse flexibility of the belt or reduce its strength; and of such character that the fastening is not weakened by the bending incident to repeatedly passing over the pulleys.

Numerous kinds of belt fasteners have heretofore been employed and although each sought to overcome some particular difficulty, none appears to be widely applicable to all the requirements specified above. In some cases, the ends of the belt have been shaved down or beveled off and then fastened with rivets or the like, but the resulting joint is comparatively weak, while the loss of belting material is often serious. In other cases the abutting ends of the belt are cut square and laced together with leather strips or the like, resulting in modified thickness and reduced strength. In still other cases metal fasteners, links, wire and the like have been employed, but these have been so shaped or disposed that the joint possessed little or no flexibility and therefore the fastening devices quickly broke after repeated bending. In most of these cases the difficulties were aggravated by idler pulleys or belt tightening devices.

In accordance with my invention, the above results are obtained by a simple and durable means in a manner which permits of ready application and detachment when desired and with a minimum loss of belting material, as will hereinafter be described.

In the accompanying drawings, illustrating the preferred embodiment of my invention, Figure 1 is a plan view of a belt showing the fasteners in place at the joint, a part of the belt being cut away for better illustration; Fig. 2 is a cross section at the joint, showing in more detail a single fastening strip in place; Fig. 3 is a perspective view of a single fastening strip; Fig. 4 is a partial section of a belt with the fastening strip on the outer surface, and with a form of rivet particularly suitable for such application; and Fig. 5 is a detail further illustrating that form of rivet.

Referring to the drawings, 1 is a belt joined together along the line 2—2 by means of fastening strips 3 and rivets 4. The belt 1 may be composed of any number of plies or layers of any ordinary material, such as leather, rubber, canvas or the like, having any thickness, so long as the belt possesses sufficient stiffness to transmit the longitudinal pull without undue creasing at the rivets. The joint line, or the line of the abutting ends of the belt, may be straight, broken, curved, or according to any configuration, the essential feature being that the joint may be spanned by transversely extending fastening strips.

The fastening strips 3 may be made of steel, brass or like material, of sufficient length to properly span the joint, and of sufficient width and thickness to have requisite strength and to accommodate rivets of sufficient diameter to prevent tearing of the belt at the rivet holes. The fastening strips are preferably narrow, so as to allow maximum flexibility in passing over the pulleys and idler. In this way, slipping or vibration of the belt or bending of the fastening devices does not occur. The fastening strips should also be sufficiently thin so as not to produce any objectionable bulge on the faces of the belt, and are preferably sufficiently short and flexible to allow full contact over the faces of crown pulleys. The two ends of each fastening strip may be beveled to a sharp edge, so that they may easily be inserted in the belting material. They may be provided with any number of holes, 5, to receive the rivets, although two on each side give requisite strength to the joint and sufficiently reduce the tendency of the belt to crease or to pull open near the ends of the splice.

The rivets, 4, may be hollow or solid and of copper, brass or other suitable material, and may consist of one piece, or of a shank and one or two metal rings. In that case the shank of the rivet should be of such length that upon compression of its projecting end or ends, the rivets are flush with the faces of the belt, as shown in Figs. 1 and 2, and hence the thickness of the belt is not materially modified at the joint.

To form a joint in a belt, as along 2—2 of Fig. 1, the two ends of the belt are cut to meet along the proposed line and holes for the rivets are punched or cut in the belt at the proper points. The fastening strips are pushed into one end of the belt so that their holes register with the holes in the belt, and then riveted in place. Then the fastening strips are pushed into the other end of the belt and riveted as before. Near the ends of the joint, shorter fastening strips, 6, may be employed in order that they may not project outside of the edge of the belt.

The fastening may be detached by forcing out the rivets in one end of the belt and removing the fastening strips, and then the belt may be shortened by cutting off that end of the belt by the desired amount and then again riveting it as before.

The above described arrangement, wherein the fastening strips are embedded in the material of the belt, is preferable where an idler or other pulleys engaging the reverse side of the belt are to be employed, but in other cases it may be preferable to place the fastening strips on the outside of the belt, as in Fig. 4. In that case any suitable rivets or other attaching means may be employed, but in Figs. 4 and 5 I have illustrated a form of split rivet 5 which is peculiarly appropriate to my purpose, in that the split and sharpened ends, may, by an appropriate tool, be spread and turned back to embed themselves in the belt as shown, leaving the pulley engaging surface quite smooth.

Having thus described my invention, what I claim is:

1. In a belt fastening, the combination with belt ends abutting each other in the plane of the belt and obliquely to the length thereof, of a plurality of short narrow fastening strips extending transversely of the belt across the line of abutment and attached to the two ends of the belt on the opposite sides of said line.

2. In a belt fastening, the combination with belt ends abutting each other in the plane of the belt and obliquely to the length thereof, of a plurality of short and narrow thin flexible fastening strips of metal extending transversely of the belt across the line of abutment and attached to the two ends of the belt on the opposite sides of said line.

In testimony whereof I affix my signature, in presence of two witnesses.

PATRICK KENNEDY.

Witnesses:
  Aug. Treadwell, Jr.,
  Mrs. Edwin French.

Copies of this patent may be obtained for five cents each, by addressing the "Commissioner of Patents, Washington, D. C."